US006714372B1

(12) United States Patent
Codilian et al.

(10) Patent No.: US 6,714,372 B1
(45) Date of Patent: Mar. 30, 2004

(54) METHOD OF MANUFACTURING A DISK DRIVE BY MEASURING THE READ WIDTH IN THE SERVO-WRITER TO SET THE WRITE UNSAFE LIMIT

(75) Inventors: Raffi Codilian, Irvine, CA (US); William D. Johns, Dana Point, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 329 days.

(21) Appl. No.: 09/967,838

(22) Filed: Sep. 28, 2001

(51) Int. Cl.7 ............................ G11B 15/04; G11B 19/04
(52) U.S. Cl. ............................. 360/60; 360/31; 360/75; 360/77.04
(58) Field of Search ........................ 360/60, 75, 77.04

(56) References Cited

U.S. PATENT DOCUMENTS 5,570,244 A * 10/1996 Wiselogel .................. 360/60
6,061,197 A * 5/2000 Wiselogel .................. 360/60
6,611,395 B1 * 8/2003 Chainer et al. ............. 360/75

* cited by examiner

Primary Examiner—David Hudspeth
Assistant Examiner—Daniell L Negron
(74) Attorney, Agent, or Firm—Milad G. Shara, Esq.; Myers Dawes Andras & Sherman; Ramin Mobarhan, Esq.

(57) ABSTRACT

A method of manufacturing a disk drive where the width of the read element is measured at servo-writing time in order to establish a write unsafe (WUS) limit corresponding to a maximum distance during writing that the write element is permitted to move radially offtrack from the centerline of a data track before writing is disabled. The method includes the steps of measuring a width of the read element with a servo track writer and determining a write unsafe (WUS) limit based on the data track pitch and the measured width of the read element. Varying the WUS limit on a drive-by-drive basis enhances the performance of some drives that would otherwise have capability that goes unused.

11 Claims, 10 Drawing Sheets

CHARACTERIZATION OF READER WIDTH
AS A PERCENTAGE OF TRACK PITCH

|  | NARROW | NOMINAL | WIDE |
|---|---|---|---|
| READ ELEMENT | 28-35% | 35-55% | 55-63% |

FIG. 10

CHARACTERIZATION OF WRITER WIDTH
AS A PERCENTAGE OF TRACK PITCH

|  | NARROW | NOMINAL | WIDE |
|---|---|---|---|
| WRITE ELEMENT | 55-60% | 60-80% | 80-90% |

FIG. 11

WUS LIMIT AS A FUNCTION OF READER WIDTH

| READ ELEMENT | | |
|---|---|---|
| NARROW | NOMINAL | WIDE |
| 16% | 20% | 24% |

FIG. 12

WUS LIMIT AS A FUNCTION OF READER WIDTH AND WRITER WIDTH

| | | READ ELEMENT | | |
|---|---|---|---|---|
| | | NARROW | NOMINAL | WIDE |
| WRITE ELEMENT | NARROW | 16% | 20% | 24% |
| | NOMINAL | 16% | 20% | 24% |
| | WIDE | 16% | 20% | 20% |

FIG. 13

METHOD OF MANUFACTURING A DISK DRIVE BY MEASURING THE READ WIDTH IN THE SERVO-WRITER TO SET THE WRITE UNSAFE LIMIT

BACKGROUND OF THE INVENTION

1. Field of the Invention

The present invention relates generally to magnetic disk drives (disk drives), and more particularly to a method of manufacturing a disk drive by using a servo track writer (STW) for measuring the width of the read element to set the write unsafe (WUS) limit.

2. Description of the Related Art

This application is directed to varying an operating parameter known as the write-unsafe limit, or "WUS limit", based on the width of a read element and, in some embodiment, on the width of a write element. As explained below, the WUS limit has historically been fixed for large groups of disk drives without regard to the actual widths of the read and write elements in a given disk drive.

1) An Exemplary Disk Drive and its Read/Write Elements

Figure 1:
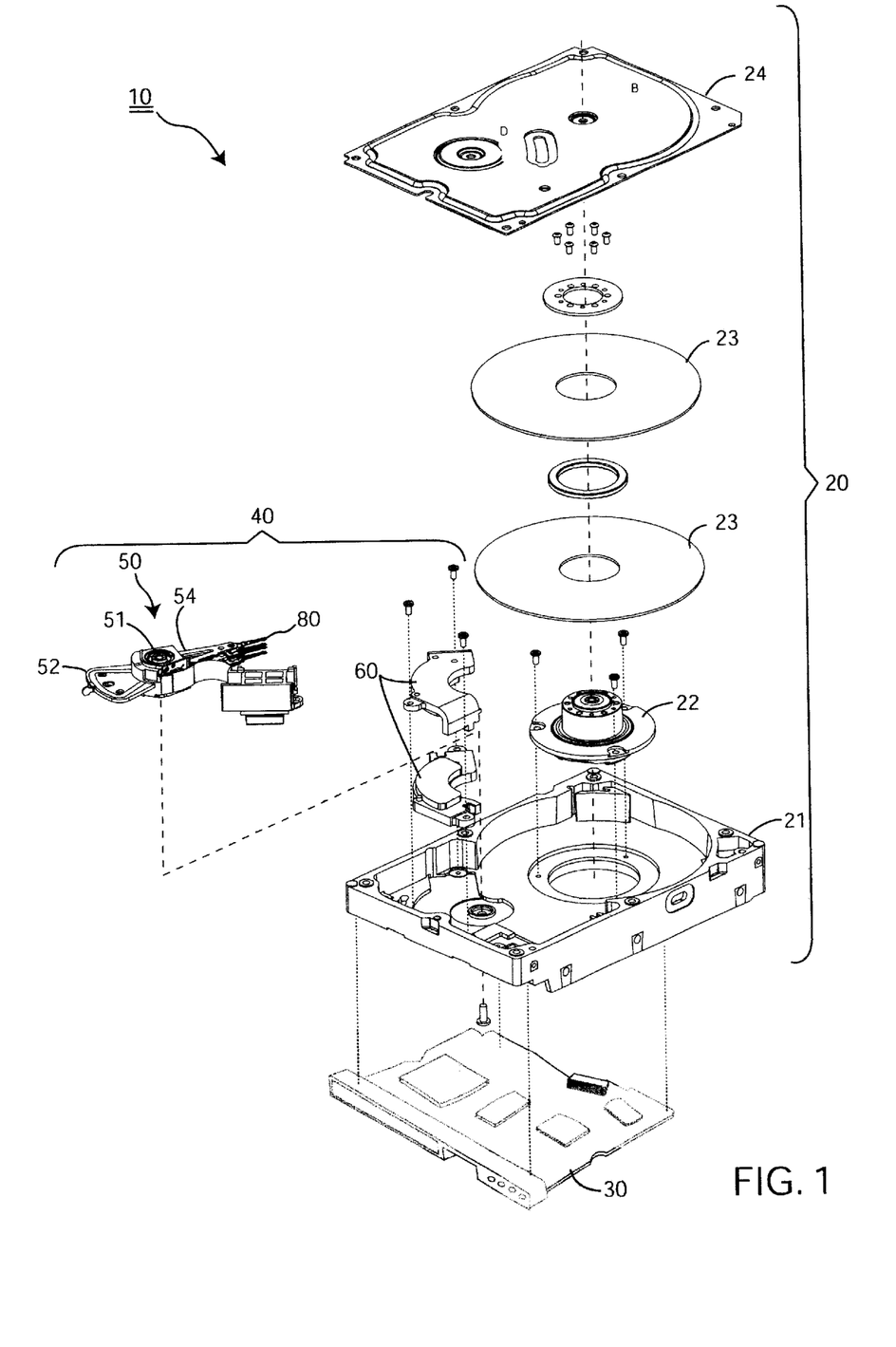
FIG. 1 an exploded perspective view of a magnetic disk drive 10 having a head disk assembly 20 ("HDA") including a head stack assembly 40 ("HSA") which carries a transducer 80 over concentric data tracks and associated servo bursts on the surface of a disk 23.

Referring to FIG. 1, a conventional disk drive 10 has a head disk assembly (HDA) 20 including at least one disk 23, a spindle motor 22 for rapidly rotating the disk 23, and a head stack assembly (HSA) 40 that includes an actuator assembly 50 and a head gimbal assembly (HGA) (not numbered) with a transducer head 80 for reading and writing data. The HSA 40 is part of a servo control system that positions the transducer head 80 over a particular track on the disk to read or write information from that track. The HSA 40 earns its name from the fact that it generally includes a plurality of HGAs that collectively provide a vertical arrangement of heads called a "head stack."

Figure 2:
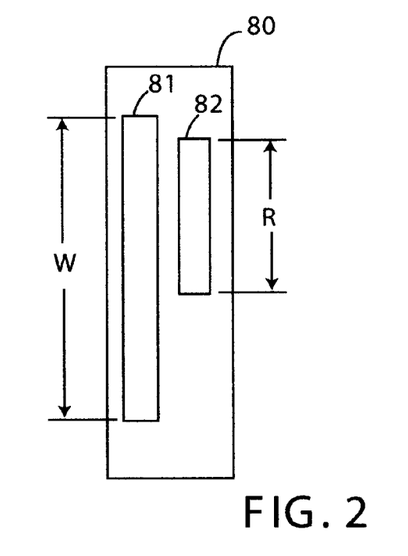
FIG. 2 is a simplified representation of a magneto-resistive transducer head 80 that has two elements that vary in width over a normal distribution curve, namely a write element 81 and a read element 82.

The transducer heads 80 of several years ago were "merged" devices where reading and writing were accomplished with a single inductive element. The transducer head 80 commonly used today, however, is a composite (MR and inductive) transducer head 80 that has separate read and write elements. FIG. 2 is a highly simplified representation of a composite transducer head 80 having it's a write element 81 of width W and it's a read element 82 of width R. The transducer head 80 shown is a "write wide, read narrow" device in that the read element's width R is typically about 50–65% of the write element's width W.

Composite transducer heads 80 are very small devices that are manufactured in large batches using photolithographic wafer process techniques. As a result, operating characteristics such as the widths of the read and write elements 81, 82 tend to vary over a normal distribution curve for a given number of heads, wafers or an manufacturers. As explained further below, the wide variability of read width R and write width W is problematic when combined with a fixed WUS limit.

Figure 3:
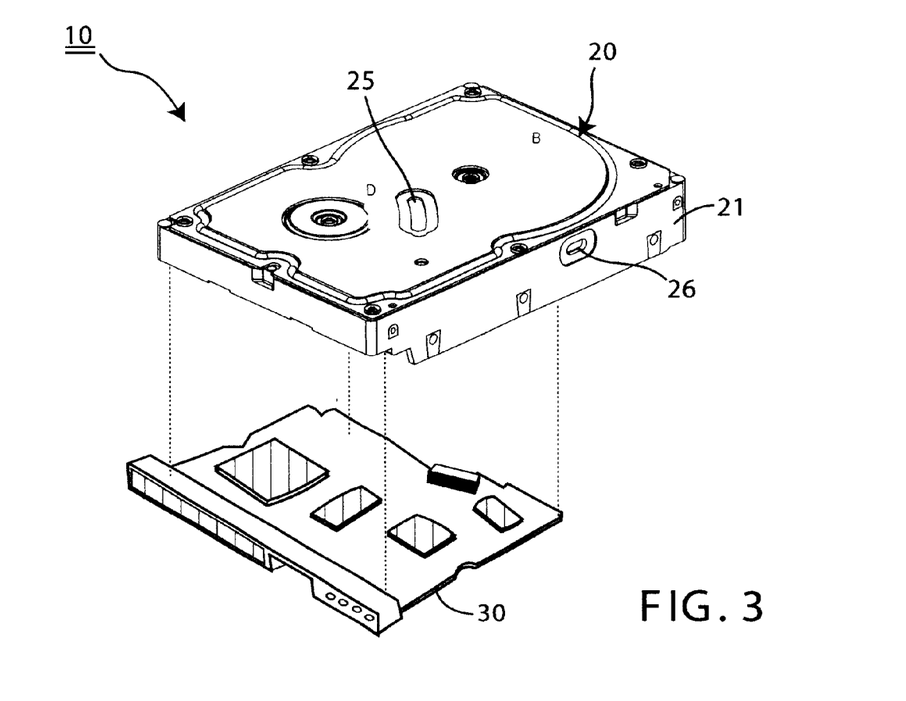
FIG. 3 is an exploded perspective view of a fully-assembled HDA 20 having servo-writing ports 25, 26 and the controller circuit board 30 that is usually installed after servo-writing.

FIG. 3 is an exploded perspective view of a fully-assembled HDA 20 having servo-writing access ports 25, 26 (discussed below) and the controller circuit board 30 that is usually installed after servo-writing. The controller circuit board 30 suitably positions the actuator assembly 50 and then reads or writes user data in accordance with commands from a host system (not shown).

Returning to FIG. 1, the industry presently prefers a "rotary" or "swing-type" actuator assembly 50 that conventionally comprises an actuator body 51 which rotates on a pivot assembly between limited positions, a coil 52 that extends from one side of the actuator body to interact with a pair of permanent magnets to form a voice coil motor (VCM), and an actuator arm 54 that extends from the opposite side of the actuator body to support the HGA.

2. An Exemplary Servo Pattern

A disk drive is ultimately used to store user data in one or more "data tracks" that are most commonly arranged as a plurality of concentric data tracks on the surface of its disk or disks. Special servo information is factory-recorded on at least one disk surface so that the disk drive's servo control system may control the actuator assembly 50, via the VCM, to accurately position the transducer head to read or write user data to or from the data tracks. In colloquial terms, the servo information provides the servo control system with the position of the head relative to the written track. In operation, the disk drive's servo control system intermittently processes (read only) the pre-recorded servo information just before the disk drive processes (reads or writes) user data in the data tracks.

3. The Write Unsafe Limit

Figure 4A:
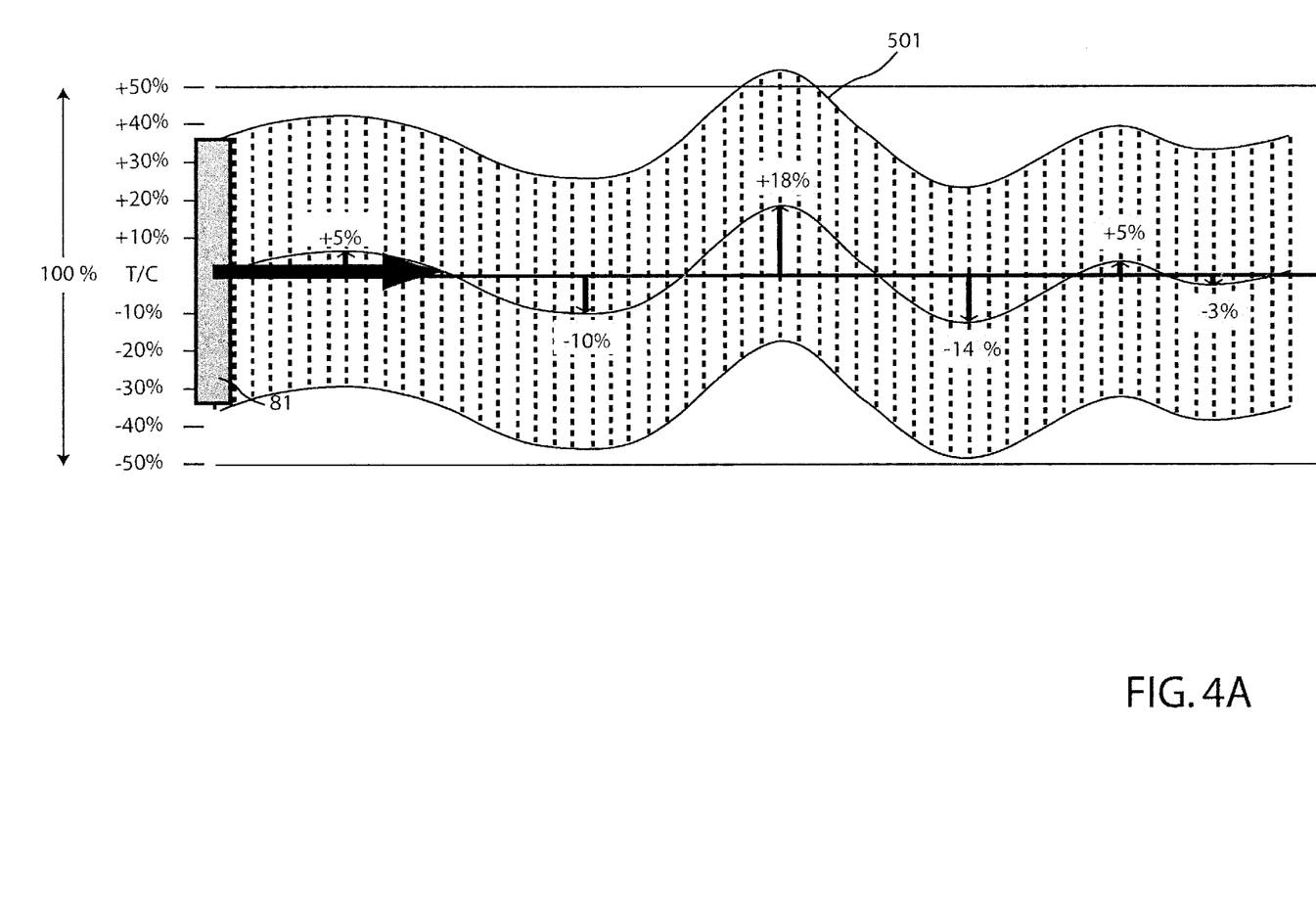
FIGS. 4A, 4B, and 4C illustrate the relationship between a write unsafe limit (WUS limit) and a potential "sliver" error including (A) a first data path 501, (B) a second data path 502 written only partially over the first data path 501, and (C) a narrow read element 82 that will suffer a sliver error if the WUS limit is set too broad.
Figure 4B:
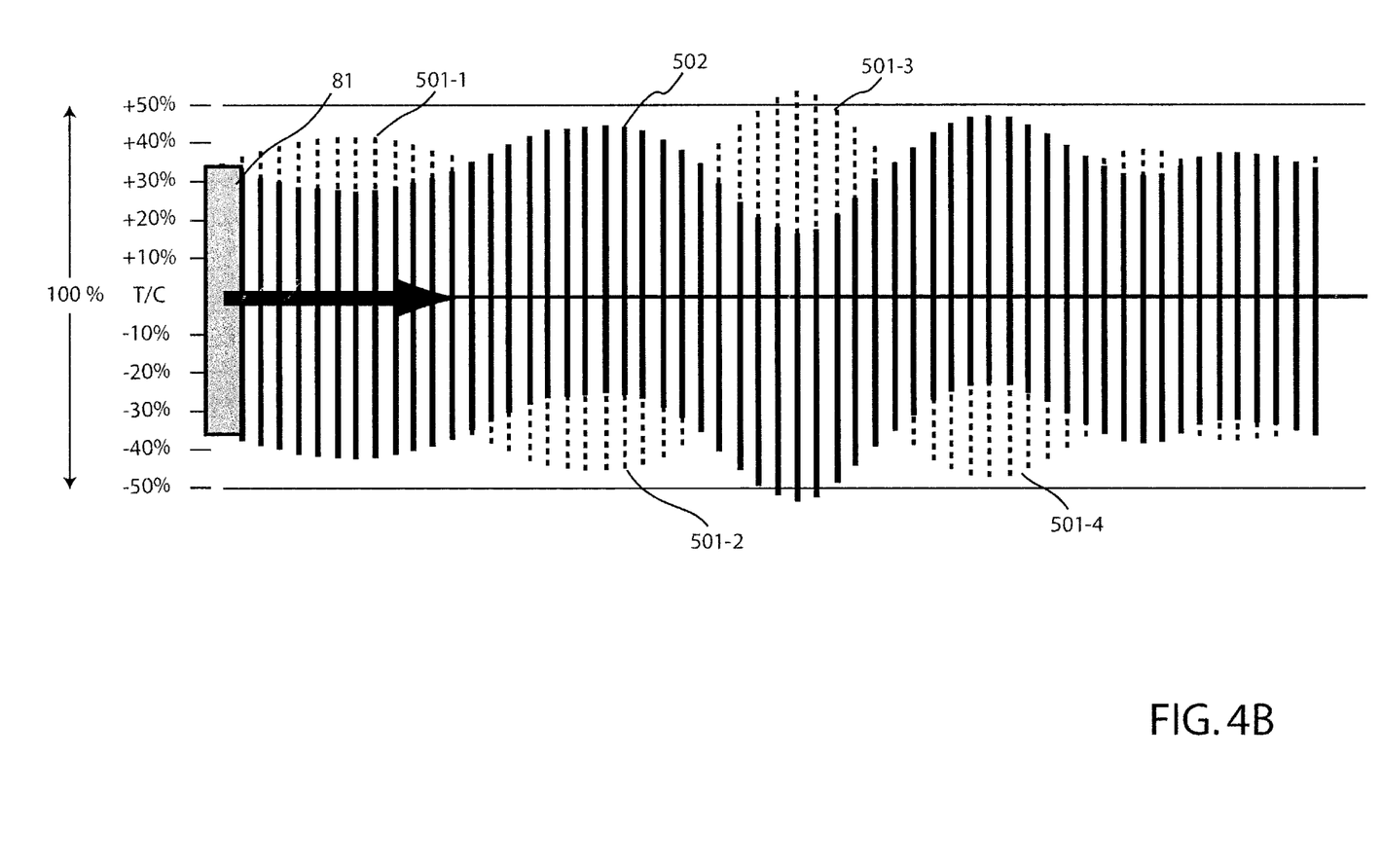
Figure 4C:
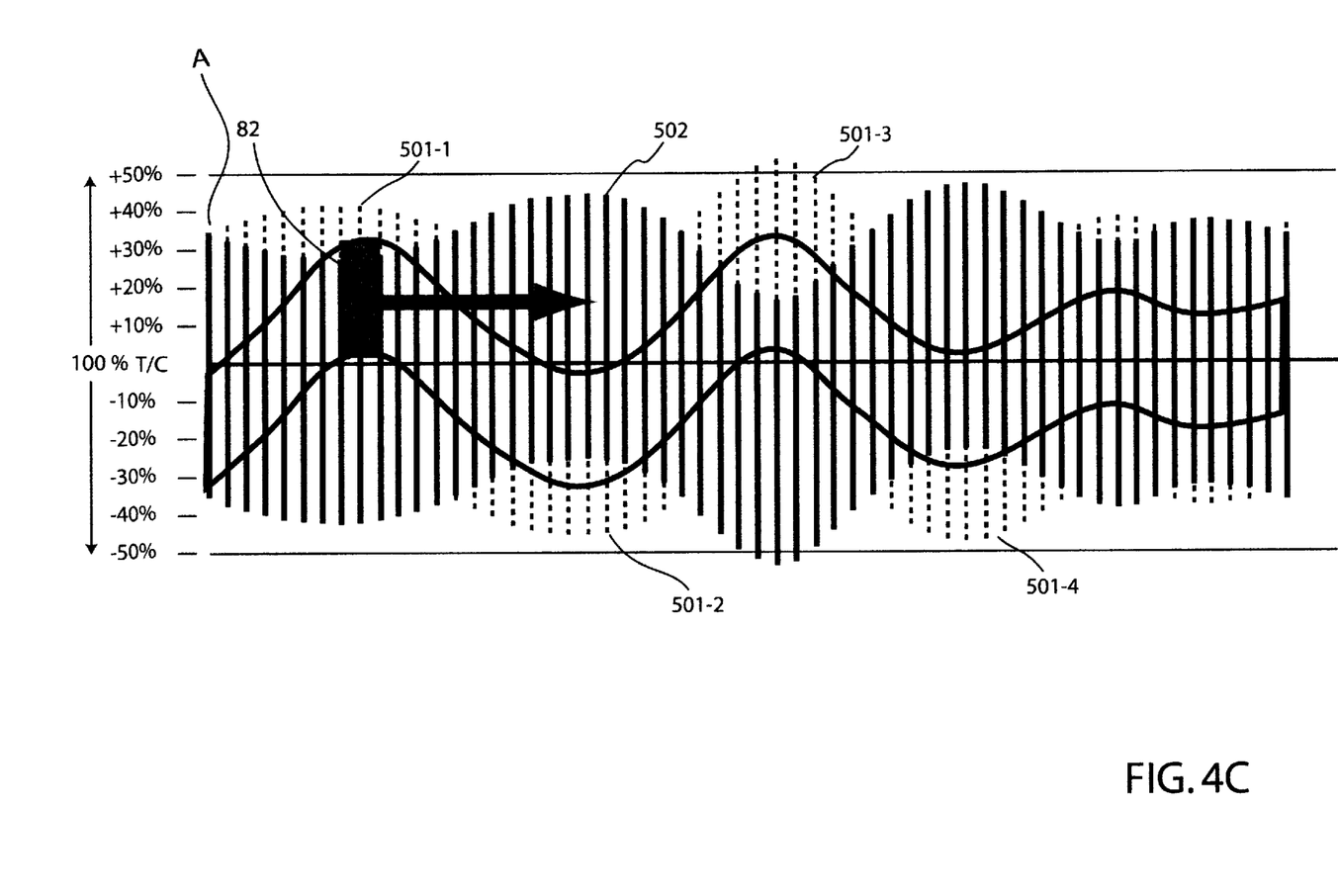

FIGS. 4A, 4B and 4C are data path diagrams that explain why a WUS limit has been used to date and why it is generally set to a small, "narrow" or "tight" value when a single WUS limit is used for a family of drives.

FIG. 4A shows a hypothetical data path 501 of a nominally wide write element 81 that is 70% as wide as the track pitch. As shown, the write element 81 settles in along a damped oscillatory path 501 after the servo control system has moved the write element 81 to the desired track in a track seek mode and then entered a track following mode. The WUS limit relates to when writing will be terminated as a function of the oscillatory deviations of the write element's path 501 relative to track center (T/C). The WUS limit, to put it another way, corresponds to the maximum off-track distance of the write element 81 before writing is disabled. The tighter the WUS limit, the more frequently that writing will be disabled. A higher frequency of disabling writing will reduce the performance of the drive.

The WUS limit is usually specified in terms of a percentage track pitch from track center T/C (e.g. ±16%). In FIG. 4A, the write element's excursions from track center T/C are signified by vertical arrows, varying from +5%, to −10%, to +18%, to −14%, to +5%, to −3%. The disk drive's servo control system stops writing the moment that the write element moves beyond the WUS limit due to resonant vibrations, a shock event, or the like. In FIG. 4A, assuming the WUS limit is set to 16%, and writing is disabled just prior to the 18% excursion. What may not be so apparent from FIG. 4A is that the WUS limit is chosen to minimize or eliminate the detrimental effect of reading erroneous data with a narrow read element. The WUS limit, in more detail, reduces so-called "sliver" errors, i.e. errors that arise from reading a sliver of old data that remains when new data is written to the same track.

FIG. 4B shows a "new" data path 502. As shown, most of the old data path 501 has been overwritten beneath the new data path 502. Exposed adjacent to the new data path 502, however, are some slivers of old data 501-1, 501-2, 501-3 and 501-4.

FIG. 4C shows a relatively narrow read element 82 attempting to read the data in the new data path 502. This particular read element 82 is represented as being 32% as wide as the data track pitch. As shown, if the data had been written from position "A" onward, i.e., with an extremely liberal WUS limit of 33%, the read element 82 may read the old data track slivers 501-1, 501-2 and 501-3 while trying to read the data on the new data path 502. This is completely unacceptable, of course, because it constitutes a data integrity error. There is no resulting ECC error to alert the disk drive's firmware to the problem. The problem simply goes undetected and the disk drive provides the host with garbled data masquerading as good data.

A WUS limit is useful for preventing sliver errors. The problem, however, is that a single WUS limit is usually applied to an entire family of disk drives even though the width of the read element varies from drive to drive. Under this one size fits all approach, the WUS limit is set to 50% of: (1) the narrowest width of the read elements used in the drive family in order to guarantee that there are no sliver errors; (2) a compromise between (i) an overly-narrow WUS limit that causes too many disk drives to fail during Initial Burn-In (IBI) for repeatedly trying to satisfy the WUS limit and (ii) an overly-wide WUS limit that permits disk drives to pass through IBI with one or more narrow read elements that make the drive susceptible to sliver errors.

The designers choose a narrow WUS limit to eliminate sliver errors from virtually all drives that pass through IBI. Unfortunately, wide read element drives are limited by an unnecessarily narrow WUS limit even though a wider WUS limit could be used for increased performance.

There remains a need for a method of manufacturing a disk drive that allows for variability of the WUS limit in order to enhance the performance of some drives that would otherwise have capability that goes unused.

SUMMARY OF INVENTION

The invention may be regarded as method of manufacturing a disk drive formed from a head disk assembly (HDA) containing at least one magnetic disk with a magnetic surface and a head stack assembly (HSA) that includes a transducer head with a write element for writing data to the magnetic disk and a read element for reading data from the magnetic disk, the method comprising the steps of: mounting the HDA in a servo track writer and moving the HSA to desired positions over the magnetic disk while writing servo tracks onto the magnetic disk to define a data track pitch; measuring a width of the read element with the servo track writer; and determining a write unsafe (WUS) limit based on the data track pitch and the measured width of the read element, the WUS limit corresponding to a maximum distance during writing that the write element is permitted to move radially offtrack from the centerline of a data track before writing is disabled.

In a more specific context, the step of determining a WUS limit is based on the data track pitch and the measured width of the read element being within a discrete number of predefined width ranges.

In a preferred embodiment of addition, the determined WUS limit is communicated forward for subsequent use by suitable firmware contained in a controller card that is attached to the HDA.

BRIEF DESCRIPTION OF THE DRAWINGS

The just summarized invention may best be understood with reference to the Figures of which.

DETAILED DESCRIPTION OF THE PREFERRED EMBODIMENT

This patent application is directed to a new, innovative method of manufacturing a disk drive and to a disk drive made in accordance with the method.

Figure 5:
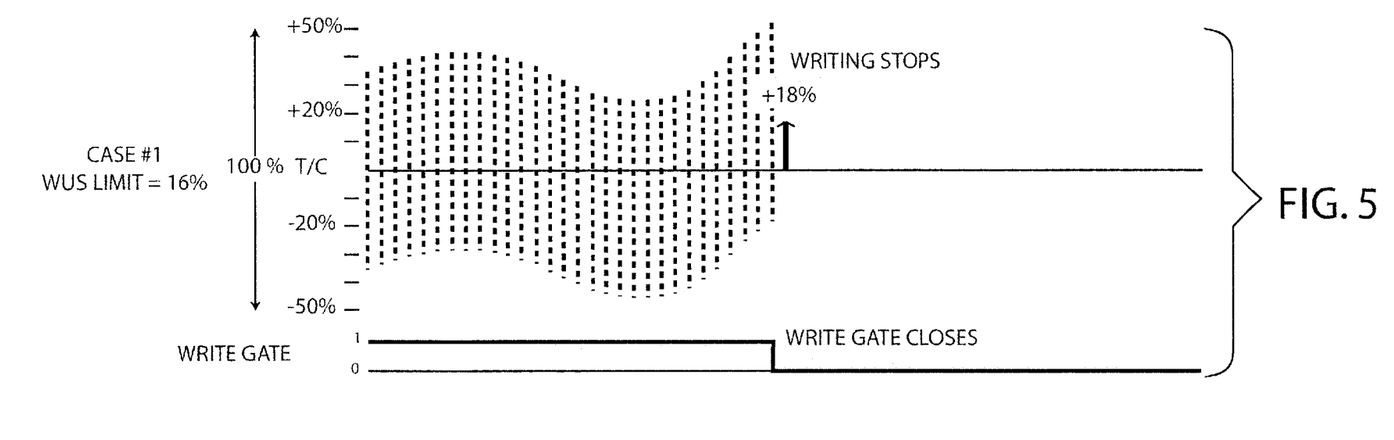
FIGS. 5 and 6 illustrate how a narrow WUS limit (e.g. 16%) inhibits writing while a broader WUS limit (e.g., 20%) permits writing to continue.
Figure 6:
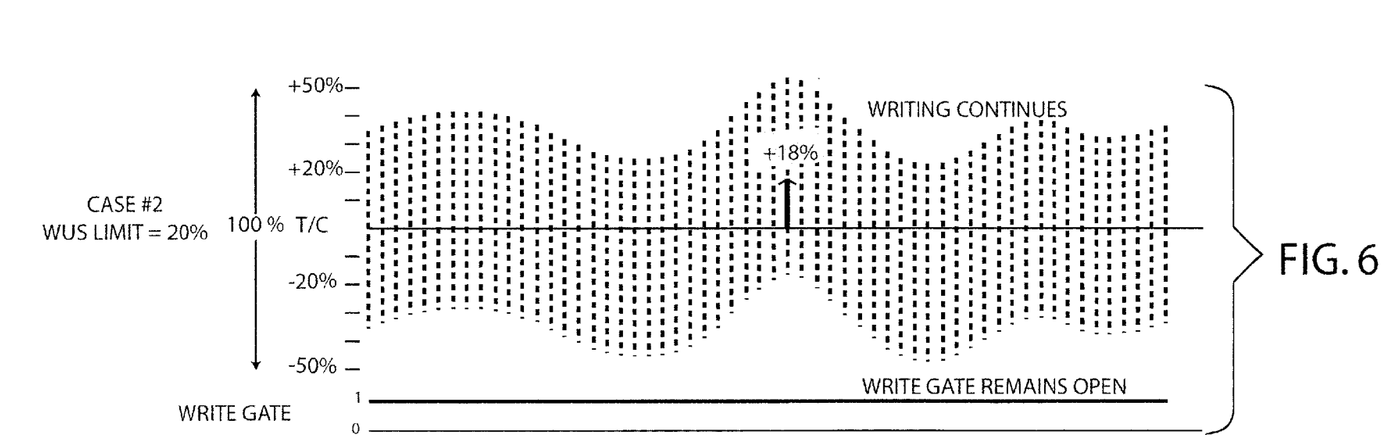

FIGS. 5 and 6 illustrate how a narrow WUS limit (e.g. 16%) inhibits writing while a broader WUS limit (e.g., 20%) permits writing to continue. In Case #1 of FIG. 5, the disk drive is writing with a narrow WUS limit of 16%. In FIG. 5, if the read element that is guiding the write element deviates from track center T/C by more than 16%, then the write gate closes, as shown, and writing stops. In Case #2 of FIG. 6, by contrast, a broader WUS limit of 20% is used. In this case, writing does not stop in the face of the same deviation from track center T/C that stopped writing in Case #1, and writing continues.

Figure 7:
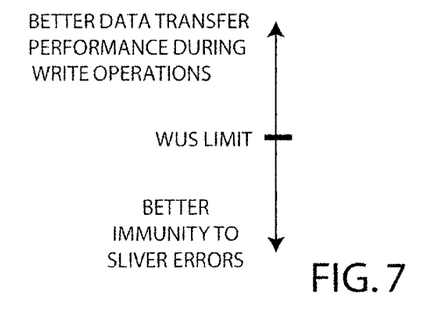
FIG. 7 shows how a broader WUS limit corresponds to better write performance while a narrower WUS limit permits narrower heads to be used without possibility of sliver error.

FIG. 7 shows how a broader WUS limit corresponds to better write performance while a narrower WUS limit permits narrower heads to be used without possibility of sliver error. The WUS limit is traditionally set on the basis of the narrowest expected read element. Preferably, a rule of thumb which may be applied is that a WUS limit that is ½ of the narrowest expected read element will prevent sliver errors for heads of that width or wider. If the narrowest expected read element is 32% of a track pitch, then the WUS limit is 16%.

Figure 8A:
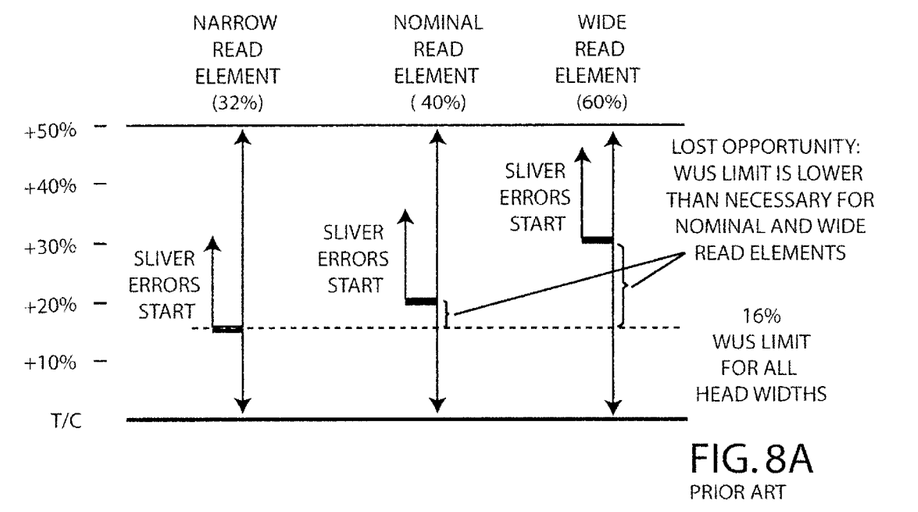
FIG. 8A shows how the prior art approach of using the WUS limit needed for a narrow read head for all read head widths constitutes a lost opportunity to have better write performance with nominal and wide heads.

FIG. 8A shows how the prior art approach of using the WUS limit needed for a narrow read head, for all read head widths, constitutes a lost opportunity to have better data transfer performance during write operations with nominal and wide heads. The nominal and wide read elements, in other words, could operate with a broader WUS limit that provides better write performance while still being less than ½ of the read element's width in order to preclude sliver errors.

Figure 8B:
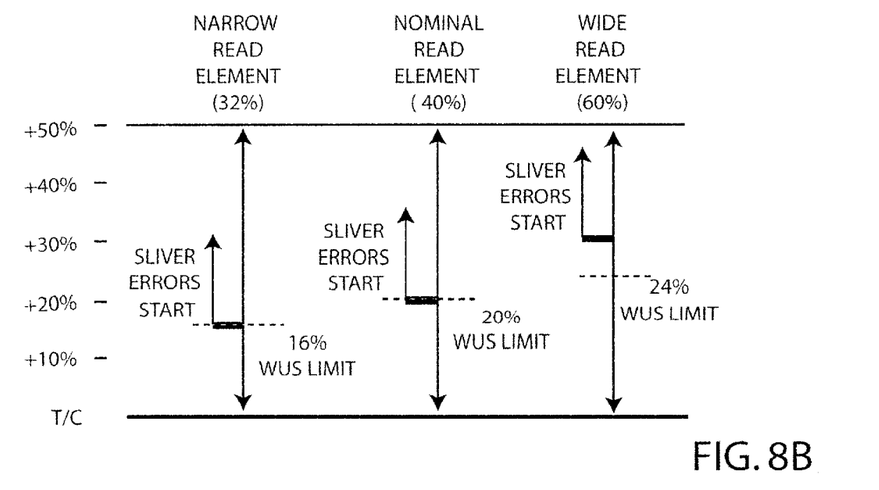
FIG. 8B shows how varying the WUS limit based on the width of the read element recaptures some of the lost opportunity illustrated by FIG. 8A.

FIG. 8B shows how varying the WUS limit based on the width of the read element recaptures some of the lost opportunity illustrated by FIG. 8A. Here, the WUS limit is varied as a function of the read element's width in order to take advantage of the presence of additional read element width.

Figure 9A:
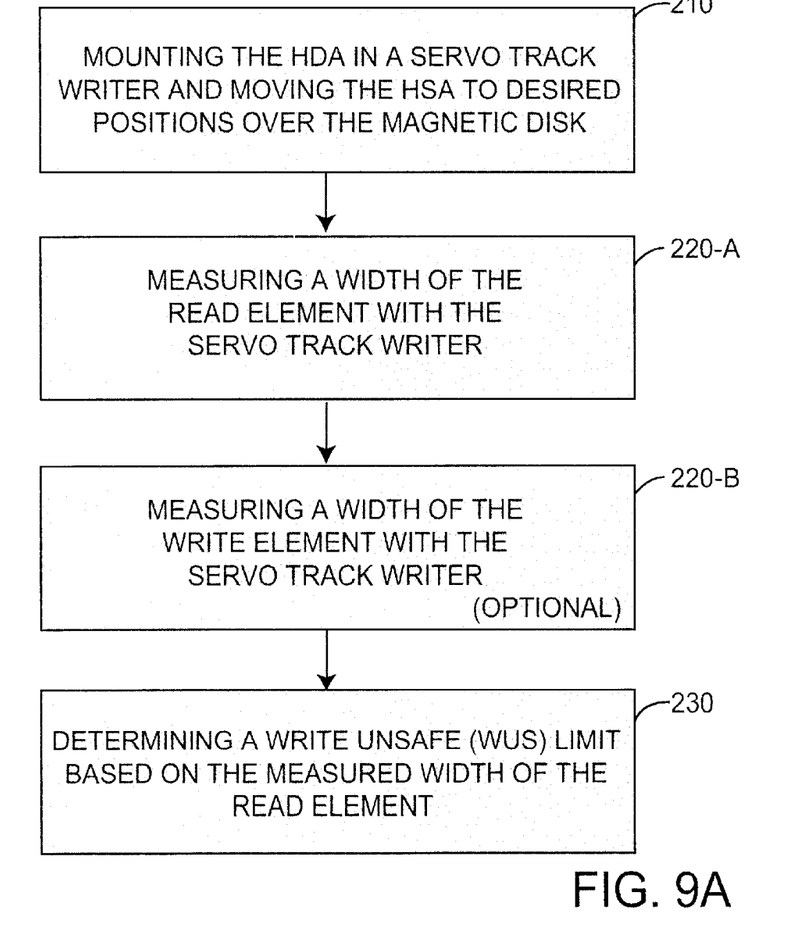
FIG. 9A is a flow-chart of a method of manufacturing according to this invention.

FIG. 9A is a flowchart of a preferred method of manufacturing a disk drive according to this invention. The illustrated method operates on an HDA 20 like that shown in FIGS. 1 and 3, i.e. an HDA 20 containing at least one magnetic disk 23 with a magnetic surface and a head stack assembly 40 that includes a two-element transducer head 80. The HDA 20 is usually placed into an STW in "bare" form (i.e. without the controller circuit board 30), but as discussed below, it may be desirable to marry the HDA 20 with the controller circuit board 30 before mounting the disk drive 10 in the STW and recording servo tracks.

A presently preferred embodiment of the method proceeds as follows:

At step 210, the method begins by mounting the HDA 20 in an STW for moving the HSA 40 to desired positions over the magnetic disk.

At step 220-A, the method proceeds by measuring a width "R" of the read element 82 with the STW. (Step 220-B is optional).

At step 230, the method proceeds by determining a WUS limit based on the measured width "R" of the read element 82.

Measuring Methods

With reference to measuring steps 220-A and 220-B (optional), any suitable measuring algorithm may be used for measuring the width of the read element R and write element W, as described for example, in application Ser. No. 09/920,665, filed on Jul. 31, 2001, and commonly owned by the assignee of this application. The entire content of this prior application is hereby incorporated by reference as if fully set forth herein.

The STW ultimately records servo tracks corresponding to a data track pitch of some specified number of tracks per inch (TPI). A single TPI value may be used for an entire family of drives or, as taught in application Ser. No. 09/920,665, the TPI may be varied from drive to drive based on the widths of the read and write elements as measure by the STW prior to performing the actual servo-writing process. The present invention may be practiced in connection with a fixed TPI or with a variable TPI such as may be established in accordance with application Ser. No. 09/920,665. If the TPI is varied according to the teachings of application Ser. No. 09/920,665, then the width of a track would be increased or decreased relative to some nominal track and the measurement of the read element as a percentage ratio of track width would change accordingly. After that point, however, the methodology of determining a WUS limit according to this invention remains the same.

Determining the WUS Limit

With reference to determining step 230, a variety of approaches may be taken to determine a WUS limit based on the measured width "R" of the read element 82 and, optionally, also based on the measured width "W" of the write element 81. The presently preferred approach involves the classification suitably measured elements 81, 82 into a discrete number of predefined width ranges, e.g. three discrete size ranges that are aptly named "narrow," "nominal," and "wide."

Figure 10:
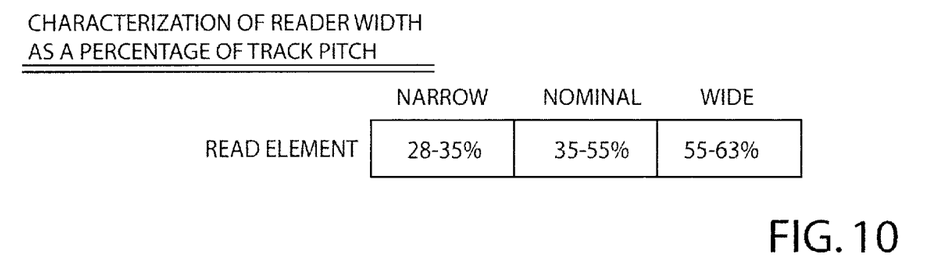
FIG. 10 shows how read elements are characterized into three discrete ranges identified as narrow, nominal or wide for use in certain embodiments of the invention.

FIG. 10 is an exemplary table of narrow, nominal and wide width ranges for a read element 81. Here, the widths are expressed as percentages of a data track pitch, but it is equally valid to specify the widths as absolute measurements of suitable units.

Figure 11:
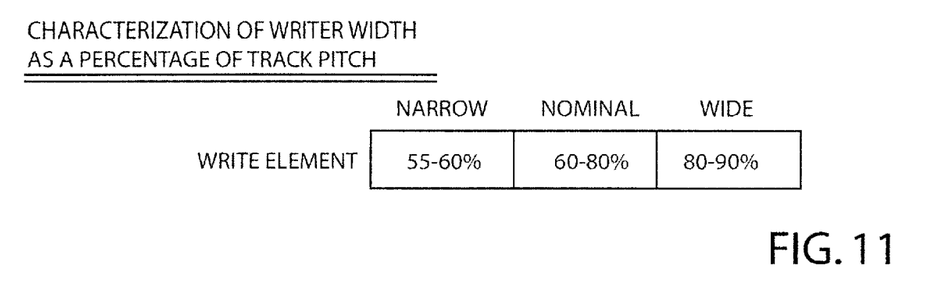
FIG. 11 shows how write elements are characterized into three discrete ranges identified as narrow, nominal or wide for use in certain embodiments of the invention.

FIG. 11 is similar to the table of FIG. 10 except that its width ranges are for use with a write element 82 rather than a read element 81. The inductive write element 82, as described above in the background section, tends to be wider than the magnetoresistive read element 81. As a point of reference, the data path diagrams of FIGS. 4A, 4B and 4C assumed a 70% write element and a 32% read element, i.e. a nominal width write element and a narrow read element. The elements in any given drive, of course, may be different.

Figure 12:
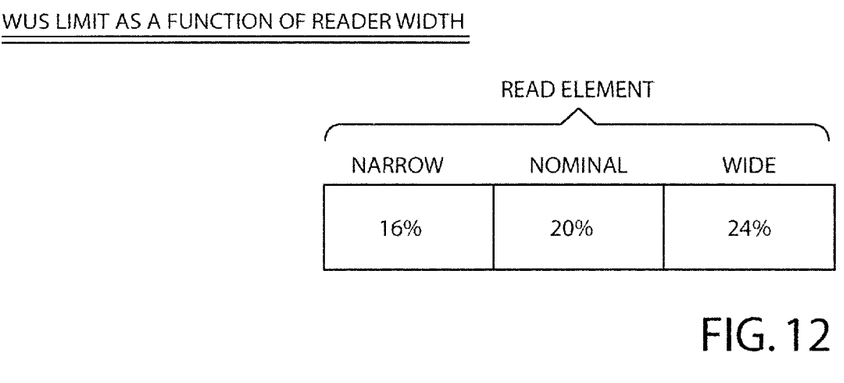
FIG. 12 illustrates a decision table for use with an embodiment of the invention where the WUS limit is set only on the basis of the write element's width.

FIG. 12 illustrates a first decision table for determining the WUS limit based on the width of the read element 82 alone. Before, all disk drives were manufactured to use a WUS limit of 16%. Here, by contrast, only a narrow read element results in a WUS limit of 16% whereas nominal and wide read elements result in broader WUS limits of 20% and 24% respectively. These percentages are exemplary only. The actual WUS limits used may vary somewhat from these values.

Figure 13:
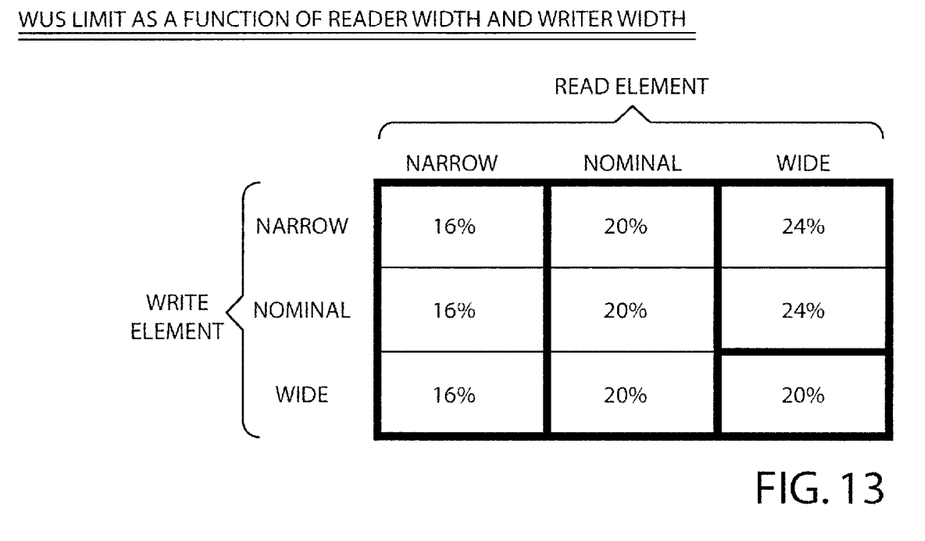
FIG. 13 illustrates a presently preferred decision table for determining the WUS limit based on the read element's width and, where the read element is classified as "wide", based on the write element's width in order to avoid encroachment issues.

FIG. 13 illustrates a presently preferred decision table for determining the WUS limit based on the width of the read element 82 and, where the read element is regarded as wide, on the width of the write element 81 as well. The concept here is that a narrow read element is always paired with a tight WUS limit of 16% and a nominal read element is always paired with a somewhat wider WUS limit of 20%. A wide read element is paired with an even larger WUS limit of 24% provided that the write element 81 is regarded as narrow or nominal. If the write element 81 is regarded as wide, however, then the WUS limit is dialed back from 24% to 20% so that the wide write element is less likely to encroach into an adjacent data track owing to such wide excursion from track center.

A plurality of WUS limits may be established on a head-by-head basis or on a drive-based WUS limit may be established for each drive based on all heads using, for example, worst case or average measurements.

Communication Forward

Figure 9B:
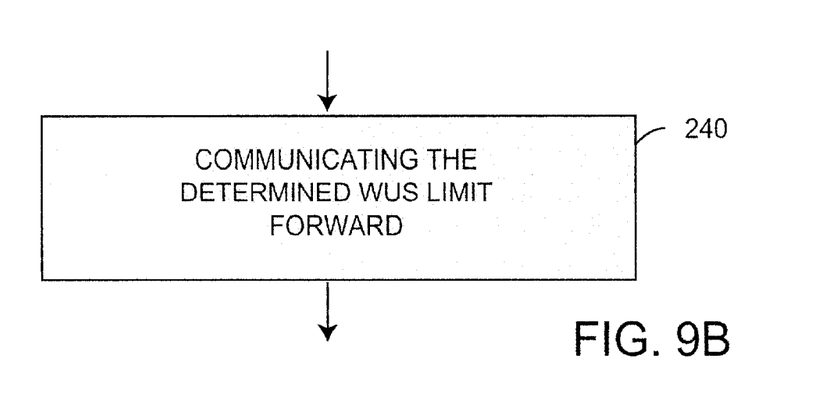
FIG. 9B is an extension of the flow-chart of FIG. 9A.

As suggested by FIG. 9B, which may be regarded as a continuation of FIG. 9A, the preferred embodiment further comprises the step 240 of communicating the determined WUS limit forward for subsequent use by suitable firmware contained in a controller card that is attached to the HDA.

There are a number of ways of accomplishing the communicating step. The preferred approach involves associating the determined WUS limit with drive identification data, electronically transmitting the determined WUS limit and HDA identification data over a communications network, and combining the WUS limit with the HDA identified by the HDA identification data during a manufacturing process that is subsequent to the servo track writer. Another approach involves-encoding the WUS limit into a label that is applied to the HDA and reading that label to apply the WUS limit to the controller card that will be combined with the HDA. In such case, the label is likely to comprise a bar code label.

We claim:

1. A method of manufacturing a disk drive formed from a head disk assembly (HDA) containing at least one magnetic disk with a magnetic surface and a head stack assembly (HSA) that includes a transducer head with a write element for writing data to the magnetic disk and a read element for reading data from the magnetic disk, the method comprising the steps of:

mounting the HDA in a servo track writer and moving the HSA to desired positions over the magnetic disk while writing servo tracks onto the magnetic disk to define a data track pitch;

measuring a width of the read element with the servo track writer; and determining a write unsafe (WUS) limit based on the data track pitch and the measured width of the read element being within a discrete number of predefined width ranges, the WUS limit corresponding to a maximum position error permitted before writing is disabled.

2. The method of claim 1, wherein the step of determining a WUS limit based on the data track pitch and the measured width of the read element establishes a narrow WUS limit if the read element is within a range of narrow widths, a nominal WUS limit if the read element is within a range of nominal widths, and a wide WUS limit if the read element is within a range of wide widths.

3. The method of claim 2 further comprising the step of measuring a width of the write element with the servo track writer and wherein the wide WUS limit is reduced in width if the write element is wider than nominal.

4. The method of claim 1 wherein the disk drive's HSA includes a plurality of transducer heads with corresponding read and write elements.

5. The method of claim 4 wherein the measuring step is performed a corresponding plurality of times to determine the width of each read element, and wherein the determining step is performed a corresponding plurality of times to determine a separate WUS limit for use with each transducer head.

6. The method of claim 4 wherein the measuring step is performed a corresponding plurality of times to determine the width of each read element, and wherein the determining step is based on a measured width of a widest one of the plurality of read elements to determine a single WUS limit for use with all transducer heads.

7. The method of claim 1 further comprising the step of communicating the determined WUS limit forward for subsequent use by suitable firmware contained in a controller card that is attached to the HDA.

8. The method of claim 7 wherein the communicating step is accomplished by associating the determined WUS limit with drive identification data, electronically transmitting the determined WUS limit and HDA identification data over a communications network, and combining the WUS limit with the HDA identified by the HDA identification data during a manufacturing process that is subsequent to the servo track writer.

9. The method of claim 7 wherein the communicating step is accomplished by encoding the WUS limit into a label that is applied to the HDA and by reading that label to apply the WUS limit to the controller card that will be combined with the HDA.

10. The method of claim 9 wherein the label comprises a bar code label.

11. The method of claim 1 further comprising the steps of measuring a width of the write element with the servo track writer and variably determining the data track pitch in the servo track writer based on the measured width of the write element and the measured width of the read element.

* * * * *